J. MATTHEWS.
Devices for Closing Bottles and other Vessels.

No. 137,941. Patented April 15, 1873.

Witnesses:
W H Herbell
Jno E Derham

Inventor:
John Matthews

UNITED STATES PATENT OFFICE.

JOHN MATTHEWS, OF NEW YORK, N. Y.

IMPROVEMENT IN DEVICES FOR CLOSING BOTTLES AND OTHER VESSELS.

Specification forming part of Letters Patent No. 137,941, dated April 15, 1873; application filed April 10, 1873.

*To all whom it may concern:*

Be it known that I, JOHN MATTHEWS, of the city, county, and State of New York, have made a new and useful Improvement in Self Sealing or Closing Device for Vessels Containing Liquids Under Pressure; and I hereby declare the following to be a full and exact description of the same, reference being had to the accompanying sheet of drawing which forms a part of this specification, in which—

Figure 1:
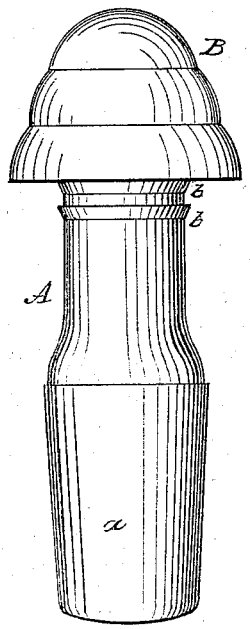
Figure 2:
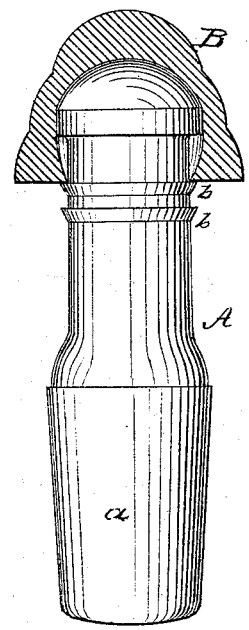

Figure 1 is a perspective view of the invention, and Fig. 2 a section of the same, partly in elevation.

This invention is an improvement on that described in patent number 67,781, issued to me, date August 13, 1867.

The following description will enable any one to make and use this invention.

A is a glass stem, and B a rubber cap, which correspond to similar parts in the patent above mentioned, but modified in the following particulars, whereby the device is rendered more useful and efficient. The portion $a$ is made tapering, which gives greater certainty in the working of the device in sealing where the neck of the bottle or other vessel is of irregular form. The part $a$, when in position, should nearly fill the space between the neck and itself above the rubber cap B, so as to prevent dust from collecting in that portion. If the portion $a$ is made straight, as shown in the invention of which this is an improvement, it must either be made too small to fit well the space so as to exclude dust, or it will become wedged fast, and no perfect sealing or closing can be effected. Sometimes the portion $a$ is slightly bent during the process of manufacture, and if made tapering it can still be used. Besides, when of a taper form, the part $a$ may be molded without any seam on the side, which cannot be done when it is straight. Another modification is the making of one, two, or more rings or projections, as shown at $b\ b$, so that the rubber cap cannot slide up the stem of A. The stem A I prefer to make of glass, but it may be of any other suitable material, such as porcelain.

Having thus described my invention, what I claim, and desire to secure by Letters Patent of the United States, is—

1. The stem A, with smooth taper end $a$, and with or without the rings $b\ b$.
2. The combination of the rubber cap B and stem A, each of the form described and shown.

JOHN MATTHEWS.

Witnesses:
W. H. HERBELL,
JNO. E. DERHAM.